US010577755B1

(12) United States Patent
Mikkelson

(10) Patent No.: US 10,577,755 B1
(45) Date of Patent: Mar. 3, 2020

(54) WIRELESS SENSOR-BASED TURF HEATING AND COOLING

(71) Applicant: SubAir Systems LLC, Graniteville, SC (US)

(72) Inventor: Bruce E. Mikkelson, Surf City, NC (US)

(73) Assignee: SubAir Systems LLC, Graniteville, SC (US)

(*) Notice: Subject to any disclaimer, the term of this patent is extended or adjusted under 35 U.S.C. 154(b) by 0 days.

(21) Appl. No.: 16/103,498

(22) Filed: Aug. 14, 2018

Related U.S. Application Data

(60) Provisional application No. 62/546,314, filed on Aug. 16, 2017, provisional application No. 62/626,387, filed on Feb. 5, 2018.

(51) Int. Cl.

| | |
|---|---|
| *A01G 25/06* | (2006.01) |
| *E01C 13/08* | (2006.01) |
| *E01C 13/02* | (2006.01) |
| *A01G 20/10* | (2018.01) |
| *H05B 1/02* | (2006.01) |
| *F28F 21/06* | (2006.01) |
| *A01G 25/16* | (2006.01) |

(52) U.S. Cl.
CPC ............ *E01C 13/083* (2013.01); *A01G 20/10* (2018.02); *A01G 25/167* (2013.01); *E01C 13/02* (2013.01); *F28F 21/062* (2013.01); *H05B 1/0244* (2013.01); *A01G 25/06* (2013.01); *Y10T 137/189* (2015.04)

(58) Field of Classification Search
CPC ...... A01G 25/06; A01G 25/16; A01G 25/162; A01G 25/165; A01G 25/167; Y10T 137/1866; Y10T 137/189; E01C 13/083
USPC ......................................... 405/37, 39, 43–45
See application file for complete search history.

(56) References Cited

U.S. PATENT DOCUMENTS

| | | | | |
|---|---|---|---|---|
| 3,908,385 A | * | 9/1975 | Daniel .................. | A01G 25/16 405/37 |
| 5,219,243 A | * | 6/1993 | McCoy .................. | A01G 25/00 405/36 |
| 5,306,317 A | * | 4/1994 | Yoshizaki ................ | A01G 9/24 47/1.01 R |
| 5,368,092 A | * | 11/1994 | Rearden .................. | A01G 25/06 165/45 |

(Continued)

*Primary Examiner* — Frederick L Lagman
(74) *Attorney, Agent, or Firm* — Myers Bigel, P.A.

(57) ABSTRACT

A turf management system includes a wireless receiver that is configured to receive respective wireless signals comprising sensor data from wireless sensors positioned in a soil profile at respective depths below a green surface. A control circuit is coupled to the wireless receiver and is configured to determine soil profile conditions at the respective depths below the green surface responsive to the sensor data. The control circuit is coupled to a subsoil environmental control mechanism and is configured to automatically control operation of the subsoil environmental control mechanism responsive to the soil profile conditions at the respective depths below the green surface. The subsoil environmental control mechanism may include an airflow mechanism that is configured to alter airflow below the green surface, and/or a hydronic mechanism that is configured to circulate fluid through a hydronic tubing network below the green surface.

19 Claims, 7 Drawing Sheets

(56) References Cited

U.S. PATENT DOCUMENTS

| | | | | |
|---|---|---|---|---|
| 5,507,595 | A * | 4/1996 | Benson | A01G 25/06 |
| | | | | 405/269 |
| 5,944,444 | A * | 8/1999 | Motz | E01C 13/083 |
| | | | | 137/561 R |
| 6,273,638 | B1 * | 8/2001 | Clarkson | E01C 13/083 |
| | | | | 137/875 |
| 6,398,455 | B1 * | 6/2002 | Vølstad | A63C 19/00 |
| | | | | 405/36 |
| 6,709,198 | B2 * | 3/2004 | Wachtel | A01G 25/06 |
| | | | | 405/36 |
| 6,997,642 | B2 * | 2/2006 | Bishop, Jr. | A01B 45/02 |
| | | | | 137/78.3 |
| 7,172,366 | B1 * | 2/2007 | Bishop, Jr. | E01C 13/02 |
| | | | | 137/78.3 |
| 7,413,380 | B2 * | 8/2008 | Corwon | E01C 13/02 |
| | | | | 137/78.3 |
| 7,645,091 | B2 * | 1/2010 | Wallace | A01G 13/06 |
| | | | | 239/135 |
| 2006/0029472 | A1 * | 2/2006 | Blackwood | E01C 13/08 |
| | | | | 405/36 |
| 2011/0174706 | A1 * | 7/2011 | Russell | A01G 25/00 |
| | | | | 210/170.01 |
| 2015/0289455 | A1 * | 10/2015 | LaBounty | A01G 13/06 |
| | | | | 405/36 |

* cited by examiner

HYDRONICS SCHEDULER

| SCHEDULE 2 | CONFIGURE SCHEDULE NAMING |
|---|---|

←

CONTROLLER DATE & TIME: 7/20/2017, 16:01:12

GLYCOL TEMP SETPOINT: 45.0 C

SCHEDULER NOTES:
DAY OF THE WEEK: (0) SUN. (1) MON. (2) TUE. (3) WED. (4) THUR. (5) FRI. (6) SAT. (7) ALL
START HOUR: HOUR OF DAY, 0-23
RUN TIME: MAXIMUM RUN TIME IS 65535 MINUTES

| ACTIVATE | | DAY OF WEEK | START HOUR | START MINUTE | RUN TIME (MINUTES) | ZONE 1 TEMP SETPOINT | ZONE 2 TEMP SETPOINT | ZONE 2 TEMP SETPOINT | |
|---|---|---|---|---|---|---|---|---|---|
| ○ | 1 | 0 | 0 | 0 | 60 MIN | 20.0 C | 20.0 C | 20.0 C | 1 |
| ○ | 2 | 0 | 12 | 0 | 60 MIN | 20.0 C | 20.0 C | 20.0 C | 2 |
| ○ | 3 | 1 | 0 | 0 | 60 MIN | 20.0 C | 20.0 C | 20.0 C | 3 |
| ○ | 4 | 1 | 12 | 0 | 60 MIN | 20.0 C | 20.0 C | 20.0 C | 4 |
| ○ | 5 | 2 | 0 | 0 | 60 MIN | 20.0 C | 20.0 C | 20.0 C | 5 |
| ○ | 6 | 2 | 12 | 0 | 60 MIN | 20.0 C | 20.0 C | 20.0 C | 6 |
| ○ | 7 | 3 | 0 | 0 | 60 MIN | 20.0 C | 20.0 C | 20.0 C | 7 |
| ○ | 8 | 3 | 12 | 0 | 60 MIN | 20.0 C | 20.0 C | 20.0 C | 8 |
| ○ | 9 | 4 | 0 | 0 | 60 MIN | 20.0 C | 20.0 C | 20.0 C | 9 |
| ○ | 10 | 4 | 12 | 0 | 60 MIN | 20.0 C | 20.0 C | 20.0 C | 10 |
| ○ | 11 | 5 | 0 | 0 | 60 MIN | 20.0 C | 20.0 C | 20.0 C | 11 |
| ○ | 12 | 5 | 12 | 0 | 60 MIN | 20.0 C | 20.0 C | 20.0 C | 12 |
| ○ | 13 | 6 | 0 | 0 | 60 MIN | 20.0 C | 20.0 C | 20.0 C | 13 |
| ○ | 14 | 6 | 12 | 0 | 60 MIN | 20.0 C | 20.0 C | 20.0 C | 14 |

Tabs: MAIN | WATER SEPARATOR | HYDRONICS | SETTINGS | FIELD SENSORS | SYSTEM RUN TIME

WIRELESS SENSOR-BASED TURF HEATING AND COOLING

CLAIM OF PRIORITY

This application claims priority from U.S. Provisional Patent Application Nos. 62/546,314 entitled "WIRELESS SENSOR-BASED HYDRONIC TURF HEATING AND COOLING" filed Aug. 16, 2017, and 62/626,387 entitled "CENTRALIZED MONITORING AND MANAGEMENT OF MICRO-CLIMATES" filed Feb. 5, 2018, the disclosures of which are incorporated by reference herein in their entireties.

FIELD

The present invention relates to turf management systems, and more particularly, to in-ground turf heating and/or cooling systems and related devices and methods of operation.

BACKGROUND

Grass plants may require certain conditions to thrive. Some factors for an optimum growing environment may include the proper amount of sun, proper air/water ratios, and/or proper soil temperatures. For example, turf grass areas, such as those on golf courses, are typically subject to moderate to heavy foot traffic on a daily or weekly basis. Excessive water retention in such areas is undesirable due to the damage that may occur as a result of foot traffic and other factors. Thus, turf grass areas are typically constructed to include some drainage capability. The soil profile of such areas may be constructed as an excavation into the soil native to the site. A high sand content root zone and frequently coarse sand or fine gravel sub-layers may be placed within this excavation. Subsurface drainage from this essentially closed basin is typically provided by drainage pipe(s) spaced from three (3) to six (6) meters apart and placed in shallow trenches in the sub-grade soil. The gravel layer(s) may promote rapid drainage of the root zone.

Damage to grass plants can also be caused by exposure to extreme (high or low) temperatures. Hydronic systems can provide heating or cooling to maintain desired root zone temperatures by pumping warm or cool fluid, such as water, from a holding tank to a grassy area via a supply pipe. The fluid is heated or cooled to a temperature at or near the desired root zone temperature, and is circulated under the grassy area through a network of in-ground flexible tubing. The working fluid is then returned to the holding tank after circulation.

SUMMARY

Some embodiments described herein are directed to hydronic systems including a subsoil airflow mechanism beneath in-ground hydronic tubing underlying a green surface. The hydronic tubing may be buried in the soil profile at a depth sufficient to avoid damage from green maintenance operations, for example, at a depth of about 8 to 10 inches or more, and may circulate heated or cooled fluid therein. The airflow mechanism may introduce the airflow through a pre-existing drainage pipe network below the soil profile. The airflow mechanism may be controlled to direct airflow around and adjacent the hydronic tubing and toward the root zone of overlying soil profile based on the detected temperature of the soil profile, thereby more evenly distributing radiant heating or cooling provided by the hydronic tubing. Soil profile temperatures may be altered by up to about 120 degrees Fahrenheit in some instances.

In some embodiments, in-ground wireless sensors may wirelessly transmit signals indicating soil profile temperatures in real-time. The in-ground wireless sensors may be distributed in multiple zones of and/or at multiple depths below the green surface. The hydronic system may automatically alter operation of the airflow mechanism, fluid heater, fluid chiller, and/or fluid circulation pump based on the signals received by the in-ground wireless sensors relative to a threshold temperature or temperature range, to increase or reduce the soil profile temperatures in real-time at one or more of the zones of the green surface. Respective user-defined threshold temperatures or temperature ranges may be specified for the multiple zones and/or multiple sensor depths via a user interface.

In some embodiments, a scheduling application may control operation of the hydronic system, including the airflow mechanism, to alter or otherwise regulate the soil profile temperatures based on one or more user-defined schedules specified via a user interface. The scheduling application may dynamically alter future scheduled operation of the hydronic system based on current or real-time operation, for example, by delaying a heating or cooling operation scheduled for a future time based on an intervening unscheduled heating or cooling operation. The scheduling application may also predictively alter the scheduled operation based on the real-time operation and/or sensor data, for example, by automatically scheduling or removing scheduled system operation based on a predicted rate of change of the current soil profile temperature(s) according to the real-time sensor data.

According to some embodiments described herein, a turf management system includes a wireless receiver configured to receive respective wireless signals comprising sensor data from wireless sensors positioned in a soil profile at respective depths below a green surface, a control circuit coupled to the wireless receiver and configured to determine soil profile conditions at the respective depths below the green surface responsive to the sensor data, and a subsoil environmental control mechanism coupled to the control circuit. The control circuit is configured to automatically control operation of the subsoil environmental control mechanism responsive to the soil profile conditions at the respective depths below the green surface.

In some embodiments, the subsoil environmental control mechanism may include a fluid flow mechanism that is configured to alter fluid flow below the green surface. For example, the fluid flow mechanism may be a blower system that is configured to be coupled to one or more drainage pipes having perforations therein below the green surface, and the control circuit may be configured to automatically control operation of the blower system to alter airflow through the one or more drainage pipes. The blower system may be configured to operate in a first mode that applies a vacuum to the one or more drainage pipes, and a second mode that applies air pressure to the one or more drainage pipes to force the airflow through the perforations therein.

In some embodiments, the subsoil environmental control mechanism may include a hydronic mechanism that is configured to circulate fluid through a hydronic tubing network below the green surface. For example, the hydronic mechanism may include at least one fluid circulation pump that is configured to be coupled to the hydronic tubing network, and a fluid heater and/or a fluid chiller coupled to the at least one fluid circulation pump. The control circuit may be configured to automatically control operation of the fluid circulation pump, the fluid heater, and/or the fluid chiller to control circulation and temperature of the fluid responsive to the soil profile conditions. In some embodiments, the subsoil environmental control mechanism may further include an airflow mechanism that is configured to direct airflow around and adjacent the hydronic tubing network and toward a root zone of the soil profile, and the control circuit may be configured to automatically coordinate operation of the airflow mechanism and the hydronic mechanism responsive to the soil profile conditions.

In some embodiments, the at least one fluid circulation pump may be a plurality of fluid circulation pumps, and the control circuit may be configured to selectively operate one or more of the fluid circulation pumps corresponding to one or more respective portions of the hydronic tubing network that are closest to respective locations of the wireless sensors from which the respective wireless signals are received. The control circuit may further comprise at least one motor start relay that is configured to activate the at least one fluid circulation pump to circulate the fluid. A current transducer may be configured to output a monitoring signal indication operation of the at least one motor start relay, and the control circuit may be configured to identify a failure of the at least one fluid circulation pump based on the monitoring signal and output an alarm signal indicative of the same.

In some embodiments, the control circuit may be configured to automatically control the operation of the subsoil environmental control mechanism responsive to the soil profile conditions exceeding a user-defined threshold or temperature range received via a user interface of a device that is communicatively coupled to the control circuit.

In some embodiments, the control circuit may be configured to automatically control the operation of the subsoil environmental control mechanism responsive to times and/or parameters for scheduled operation received via a scheduling application executing on a device that is communicatively coupled to the control circuit. For example, the input may be received via a user interface of a wireless device executing the scheduling application, which is communicatively coupled to the control circuit via a wireless communication interface. In some embodiments, the scheduling application may be configured to dynamically alter the times and/or parameters for the scheduled operation based on present operation of the subsoil environmental control mechanism, for example, by delaying a heating or cooling operation scheduled for a future time based on an intervening unscheduled heating or cooling operation. In some embodiments, the scheduling application is configured to predictively alter the times and/or parameters for the scheduled operation based on a predicted rate of change of the soil profile conditions determined from the sensor data, for example, by automatically scheduling or removing scheduled system operation based on a predicted rate of change of current soil profile temperature(s).

According to some embodiments described herein, a turf management system includes a hydronic mechanism including a fluid circulation pump that is configured to be coupled to a hydronic tubing network below a green surface, an airflow mechanism including a blower system that is configured to be coupled to one or more drainage pipes having perforations therein below the green surface, and a control circuit that is coupled to the hydronic mechanism and the airflow mechanism. The control circuit is configured to operate the airflow mechanism to direct airflow through the one or more drainage pipes and the perforations therein toward the hydronic tubing network responsive to operation of the hydronic mechanism to circulate fluid through the hydronic tubing network.

In some embodiments, the turf management system may further include a wireless receiver coupled to the control circuit and configured to receive respective wireless signals comprising sensor data from wireless sensors positioned in a soil profile at respective depths below the green surface. The control circuit may be configured to determine soil profile conditions at the respective depths below the green surface responsive to the sensor data, and to automatically operate the airflow mechanism and the hydronic mechanism in coordination to direct airflow around and adjacent the hydronic tubing network and toward a root zone of the soil profile responsive to the soil profile conditions. For example, the hydronic mechanism may include a fluid heater and/or a fluid chiller coupled to the fluid circulation pump, and the control circuit may be configured to automatically operate the fluid heater and/or the fluid chiller to control temperature of the fluid based on the soil profile conditions. In some embodiments, the control circuit may be further configured to automatically operate the airflow mechanism and/or the hydronic mechanism responsive to times and/or parameters for scheduled operation received via a scheduling application executing on a device that is communicatively coupled to the control circuit.

According to some embodiments described herein, a turf management method includes receiving, via a user interface, times and/or parameters for scheduled operation of a subsoil environmental control mechanism that includes an airflow mechanism configured to alter airflow below a green surface and/or a hydronic mechanism configured to circulate fluid through a hydronic tubing network below the green surface. Scheduling data indicating the times and/or parameters is generated, and an output signal including the scheduling data is transmitted to a control circuit coupled to the subsoil environmental control mechanism. The control circuit is configured to automatically operate the airflow mechanism and/or the hydronic mechanism according to the times and/or parameters indicated by the scheduling data.

In some embodiments, the times and/or parameters for the scheduled operation may be dynamically altered based on present operation of the subsoil environmental control mechanism. In some embodiments, soil profile conditions at respective depths below the green surface may be determined based on sensor data received from wireless sensors positioned in a soil profile at the respective depths below the green surface, and the times and/or parameters for the scheduled operation may be predictively altered based on a predicted rate of change of the soil profile conditions determined from the sensor data.

BRIEF DESCRIPTION OF THE DRAWINGS

FIG. 7 is a screen shot of an example graphical user interface illustrating a scheduling application for controlling operation of hydronic mechanisms in turf management systems in accordance with some embodiments described herein.

DETAILED DESCRIPTION

Embodiments described herein may arise from realization that some existing in-ground hydronic systems may be limited due to the potential for damage to the flexible tubing, for example, during aeration or other maintenance operations that are typically performed on an overlying grassy area, also referred to herein as a "green surface" or "turf." While the tubing may be buried at depths that are sufficient to avoid damage from green maintenance, such depths may be deeper than the root zone of the grass plants, which may be insufficient for heating and cooling of the root zone to aid survival of the grass plants.

Accordingly, some embodiments described herein provide turf management systems, devices, and methods of operation that are configured to maintain ideal or desired root zone temperatures during warm and cool season operation by utilizing a fluid flow mechanism. As used herein, fluid flow may refer to the flow of fluids, including liquid and gases, although embodiments are primarily described herein with reference to airflow. For example, embodiments described herein may use a blower or other flow mechanism to create airflow through the root zone, thereby more evenly distributing the heating or cooling effects of the interconnected hydronic tubing network, even when the hydronic tubing is buried at greater depths as may be sufficient to avoid damage from green maintenance operations. In particular embodiments, the airflow mechanism may be a blower that is connected to an in-ground drainage network via an air line, using the network of interconnected and perforated drainage pipes to access the soil profile. That is, the blower can apply pressure to force air into the underlying interconnected subsoil drainage pipes and through the holes therein, along and/or around the hydronic tubing containing the circulating heated or cooled fluid (to heat or cool the air), and into the root zone in the overlying soil profile. Further embodiments described herein provide automated control over the airflow provided by the airflow mechanism and/or the heating/cooling provided by the hydronic mechanism based on real-time turf information provided by in-ground wireless sensors.

Figure 1A:
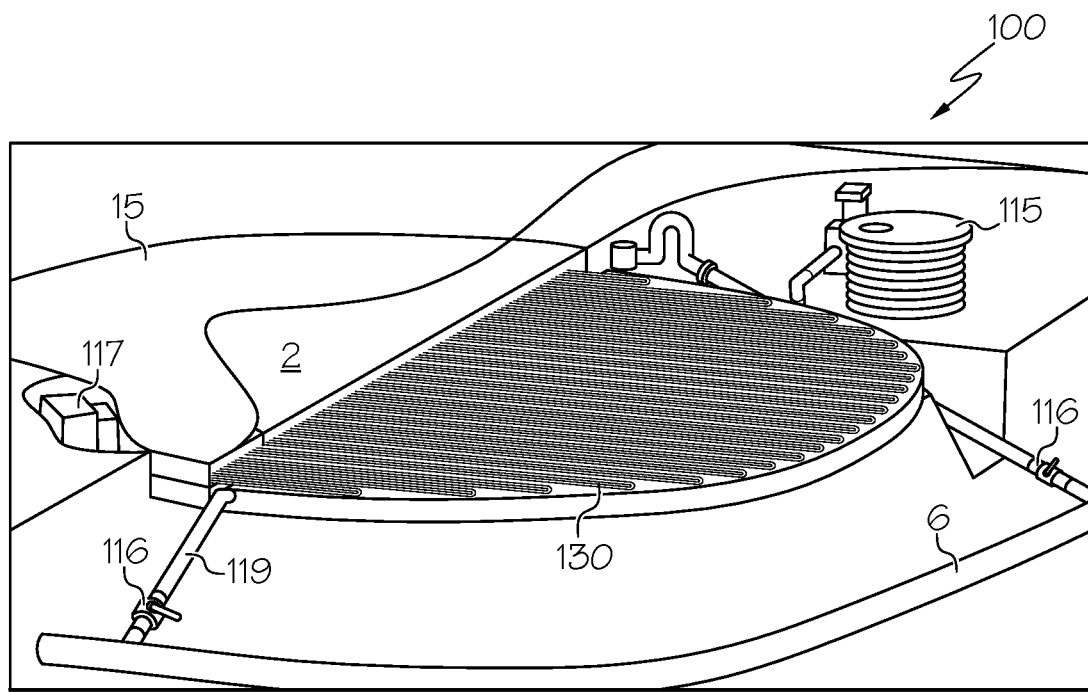
FIG. 1A is a system diagram illustrating an example hydronic tubing network and airflow mechanism installed in an operating environment for turf management systems in accordance with some embodiments described herein.

As shown in the turf management system 100 of FIG. 1A, a network of interconnected hydronic tubing 130 is positioned beneath the surface of the green 15, for example, between the root zone of the soil profile 2 and the perforated drainage pipes 119. The hydronic tubing 130 is buried beneath the surface of the green 15 at depths of about 8 to 10 inches or more, which may reduce or avoid damage from aeration or other maintenance operations typically performed on the surface of the green 15. In the example of FIG. 1A, the hydronic tubing 130 is illustrated as extending in a serpentine manner beneath the green surface 15, but may be implemented in other interconnected arrangements as well.

Figure 1B:
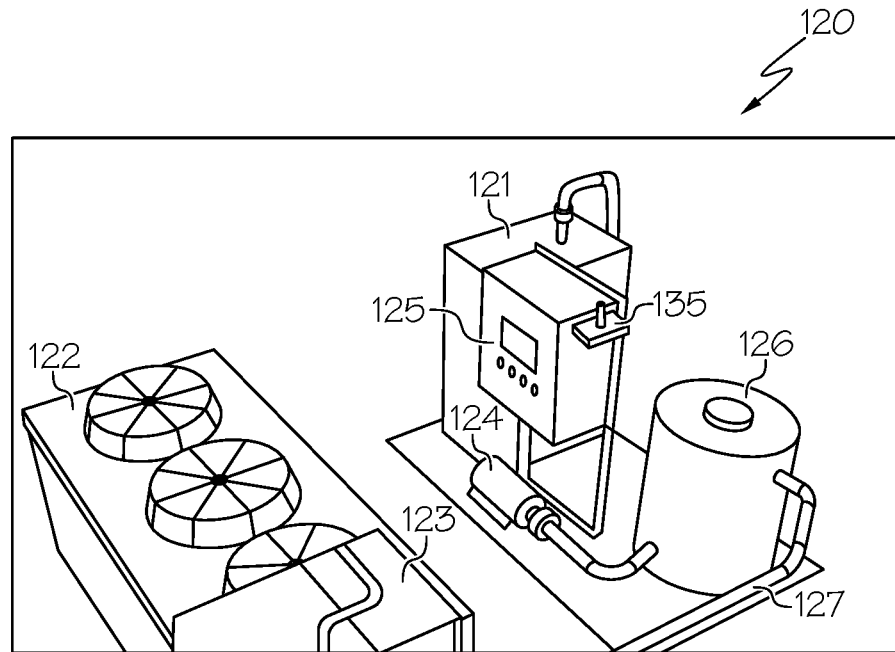
FIG. 1B illustrates elements of an example hydronic heating/cooling mechanism that is configured to circulate heated or cooled fluid through in-ground hydronic tubing of turf management systems in accordance with some embodiments described herein.

As shown in FIG. 1B, a hydronic turf temperature control system in accordance with some embodiments described herein is connected to the hydronic tubing 130 shown in FIG. 1A, and is collectively referred to herein as hydronic mechanism 120. The hydronic mechanism 120 may include a boiler 121 (for heating of the fluid), a chiller 122 (for cooling of the fluid), a chiller pump 123, a green pump 124, a holding tank 126, and a control panel or circuit 125 (which may include temperature and/or pressure instrumentation) in a control enclosure. The system 120 may be skid-mounted, with the holding tank 126, control circuit 125, and green pump 124 on one skid, and the chiller 122 and chiller pump 123 on another. The skid-mounted hydronic mechanism 120 can be housed away from the green surface 15. The hydronic mechanism 120 allows warm or cool fluid to be pumped from the holding tank 126 to the field/green surface 15 via a supply pipe. The fluid then circulates under the root zone of the soil profile 2 through the network of hydronic tubing 130. The hydronic tubing 130 may be flexible and/or may otherwise extend in a snaking manner under the root zone of the soil profile 2.

In the examples of FIGS. 1A and 1B, the airflow mechanism 115 includes a blower system that is configured to provide both vacuum mode operation (to pull water from the green surface 15 and through the soil profile 2 toward the subsoil drainage pipes 119) and pressure mode operation (to force air from the perforations in the subsoil drainage pipes 119 through the soil profile 2 toward the green surface 15), and is housed in a vault located away from the green surface 15. The drainage pipes 119 of FIG. 1A may define part of a drainage network, such as the drainage network 1 shown in FIG. 2. In these examples, a distributed separator (element 5 in FIG. 2) is connected to the green's drainage network 1 to separate the air from the water, so that the air flows to the airflow mechanism 115 and the water drains to the outfall (element 6 in FIG. 2). A dual valve 116 may be used on the end of each outfall 6 to create an air lock, which directs the air through the soil profile 2 so that the air does not escape through an end of the drainage pipes 119.

Figure 2:
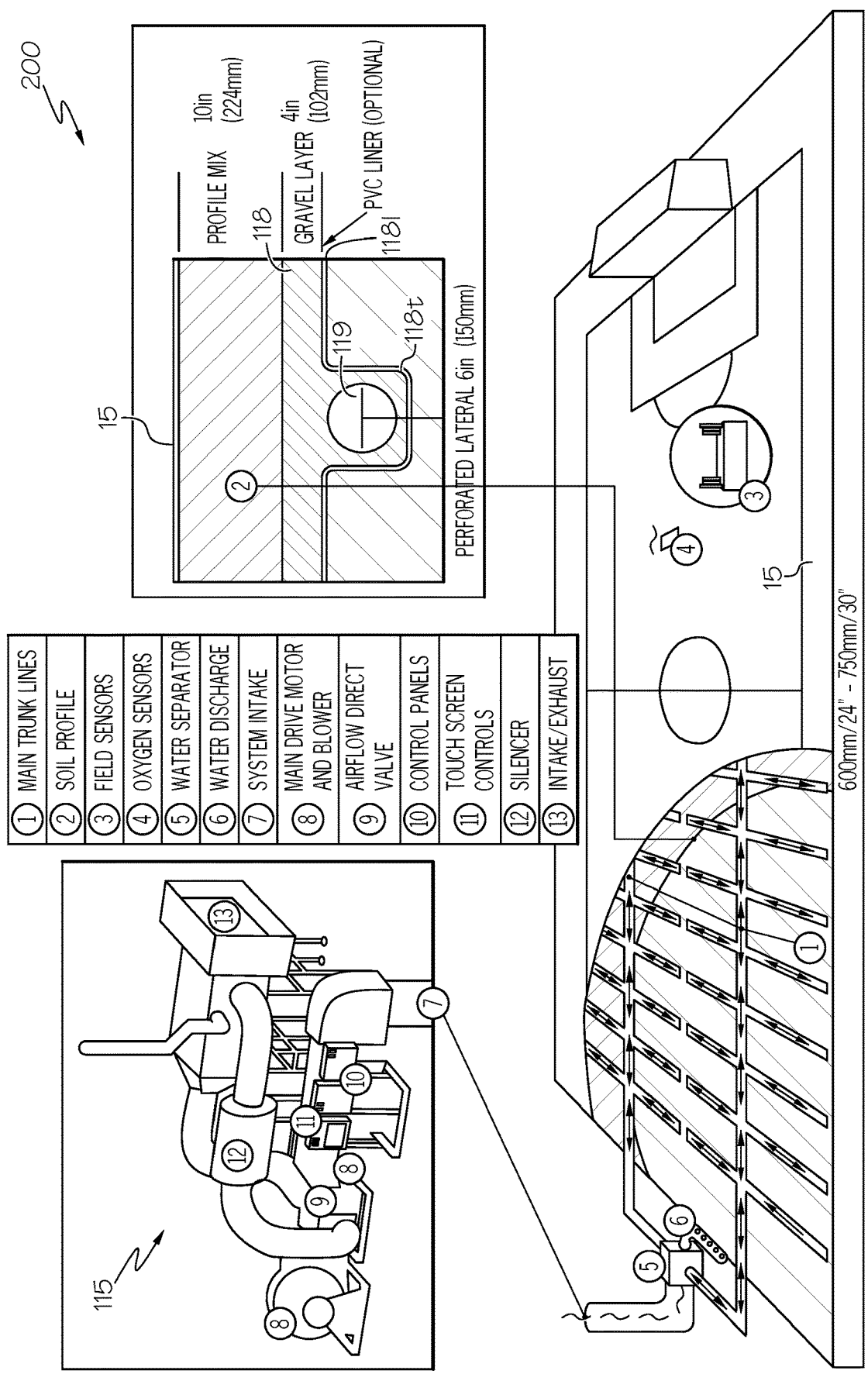
FIG. 2 is a system diagram illustrating elements of an example airflow mechanism installed in a sports field operating environment for interoperation with hydronic systems in accordance with some embodiments described herein.

A more detailed view of the airflow mechanism 115 including a blower system 8 as implemented in a sports field application 200 is shown in FIG. 2. The blower system 8 connects to the main drainage collector and moves air through the in-ground drainage network 1 utilizing the perforated holes in the drainage pipes 119 to access the soil profile 2. In particular, the main drainage collector is intercepted by an air line, and the air line connects to an air-water separator 5 installed between the field 15 and the blower system 8. The airflow mechanism further includes a system inlet/outlet 7, an airflow direct valve 9, a control panel 10 (including touchscreen 11), a silencer 12, and an intake/exhaust 13. Wired and/or wireless field sensors 3 and oxygen sensors 4 may also be provided in the soil profile 2 at one or more depths below the green surface 15.

The airflow mechanism 115 is configured to operate in a vacuum mode and a pressure mode. Activating the vacuum mode applies a vacuum to the perforated drainage pipes 119 of the subsoil drainage pipe network 1 to increase the rate at which water is moved from the green surface 15 and through the soil profile 2. This can reduce or remove standing water in a relatively short amount of time, reduce or remove non-capillary water from the soil profile 2, and introduce fresh air into the root zone. For example, in sports field applications, the vacuum mode can be used to remove standing water during games or other events. The management of subsoil moisture can also aid temperature moderation in the entire soil profile 2. Activating the pressure mode forces airflow through the drainage pipes 119 and the perforations therein to inject fresh air into the soil profile 2, for example, during stressful events or extreme temperatures (hot or cold). The blower system 8 can be run in pressure mode to continuously inject fresh air into the soil profile 2 during concerts or other events during which the green surface 15 is temporarily covered. The inset image of FIG. 2 illustrates an example positioning of a perforated drainage pipe 119 beneath the field surface 15 in a gravel-filled trench 118$t$, with a root zone soil profile mix 2 positioned above a (minimally 100 mm thick) fine gravel layer 118. A PVC liner layer 118$l$ may optionally be provided under the gravel layer 118.

Turf management systems in accordance with some embodiments of the present invention can use the pressure mode operation of the airflow mechanism 115 including the blower system 8 to expedite the activity of hydronic-based cooling and/or radiant heating mechanism 120. In the pressure mode, air is drawn through the exhaust pipe and is pushed through the perforations in the subsoil drainage pipes 119, past the heated/cooled fluid in the hydronic tubing 130 (which heats or cools the air), through the soil profile 2 and into the root zone. This creates air movement that provides aeration while moderating temperature in the root zone of the soil profile 2. In some embodiments, up to 120 degrees Fahrenheit or more of temperature adjustment in the soil profile 2 can be achieved.

Figure 3:
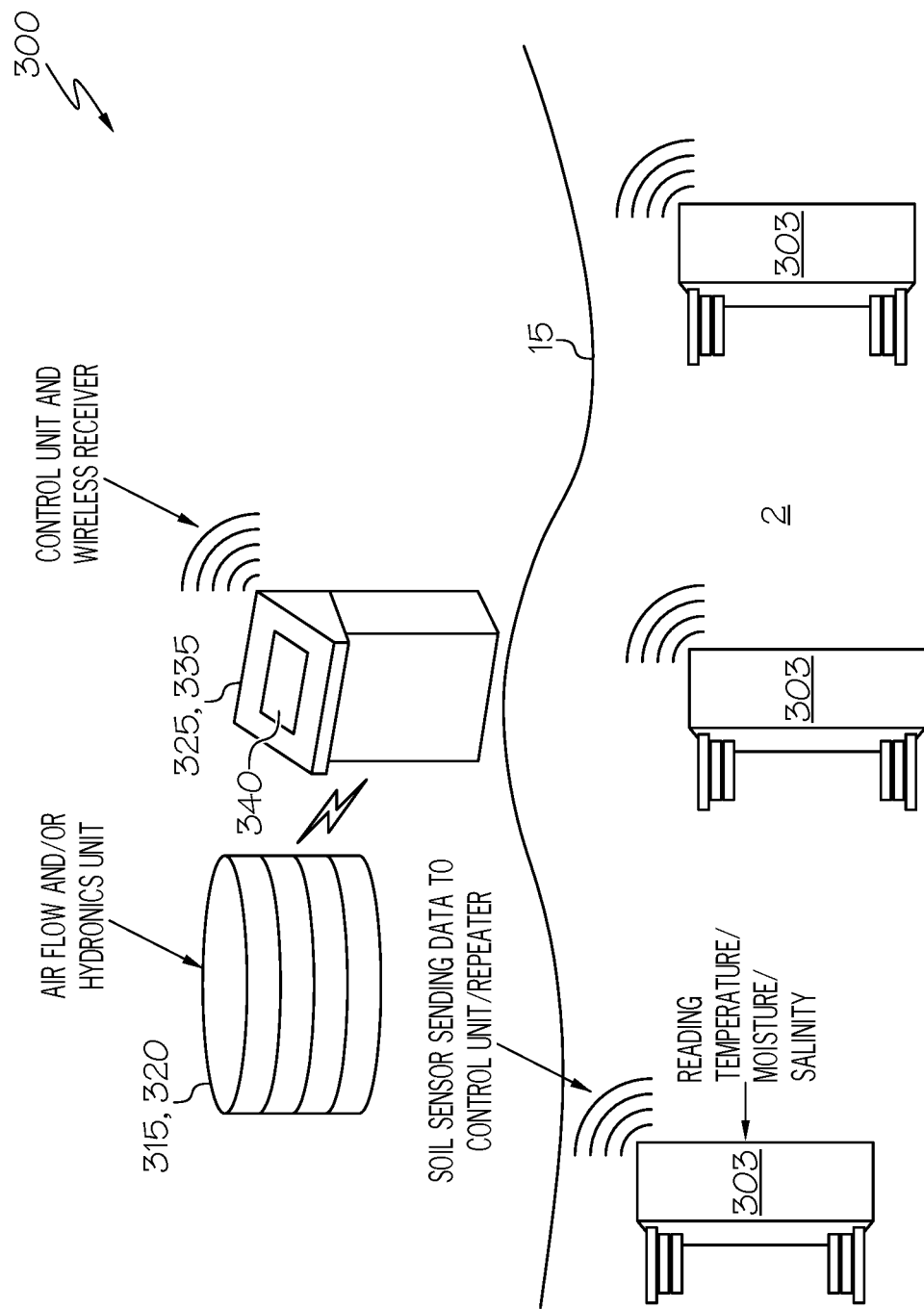
FIG. 3 is a system diagram illustrating wireless sensor-based data communication in turf management systems in accordance with some embodiments described herein.

FIG. 3 is a system diagram illustrating wireless sensor-based data communication in turf management systems in accordance with some embodiments described herein. As shown in FIG. 3, the turf management system 300 includes a control unit or controller circuit 325 that is communicatively coupled to a plurality of environmental sensors 303 via a communication interface (illustrated as a wireless receiver 335). The control unit may be coupled to a subsoil airflow mechanism 315 and/or in-ground hydronic mechanism 320 underlying the green surface 15, and may be configured to monitor and control operation of the airflow mechanism 315 and/or in-ground hydronic mechanism 320 in real-time.

In the example of FIG. 3, the turf management system includes one or more environmental sensors 303 buried in the soil profile 2 at different depths below the green surface 15. The environmental sensors 303 are illustrated in FIG. 3 as in-ground wireless sensors, but other types of sensors may also be used, alone or in combination. The sensors 303 may be distributed in multiple zones of and/or at multiple depths below the green surface 15, and may be configured to detect and transmit wireless signals including sensor data indicating one or more soil profile conditions, including soil temperatures, moisture, salinity, and/or concentration levels of oxygen (and/or other elements, e.g., nitrogen, phosphorus, etc.) to the control unit 325 via a local network protocol or interface.

The control unit 325 may be configured to generate and transmit control signals to operate the turf management mechanism 300 (e.g., subsoil airflow mechanism 315 and/or in-ground hydronic mechanism 320 underlying the green surface 15) based on the real-time data collected by the sensors 303. In some instances, the control unit 325 may be configured to provide the control signals responsive to user input via a user interface 340, and/or automatically based on the detected conditions relative to one or more thresholds. For example, user-defined thresholds for soil profile temperature and/or moisture level ranges may be specified via the user interface 340, and the control unit 325 may provide the control signals to alter operation of the subsoil airflow mechanism 315 and/or in-ground hydronic mechanism 320 when the sensor data from the wireless signals indicates that one or more of the environmental conditions falls outside the respective thresholds, to alter and/or maintain desired soil profile temperatures and/or moisture levels beneath the green surface 15. The control unit 325 is thereby configured to automatically control operation of a subsoil airflow mechanism 315 and/or in-ground hydronic mechanism 320 underlying the green surface 15 in real-time.

Figure 4:
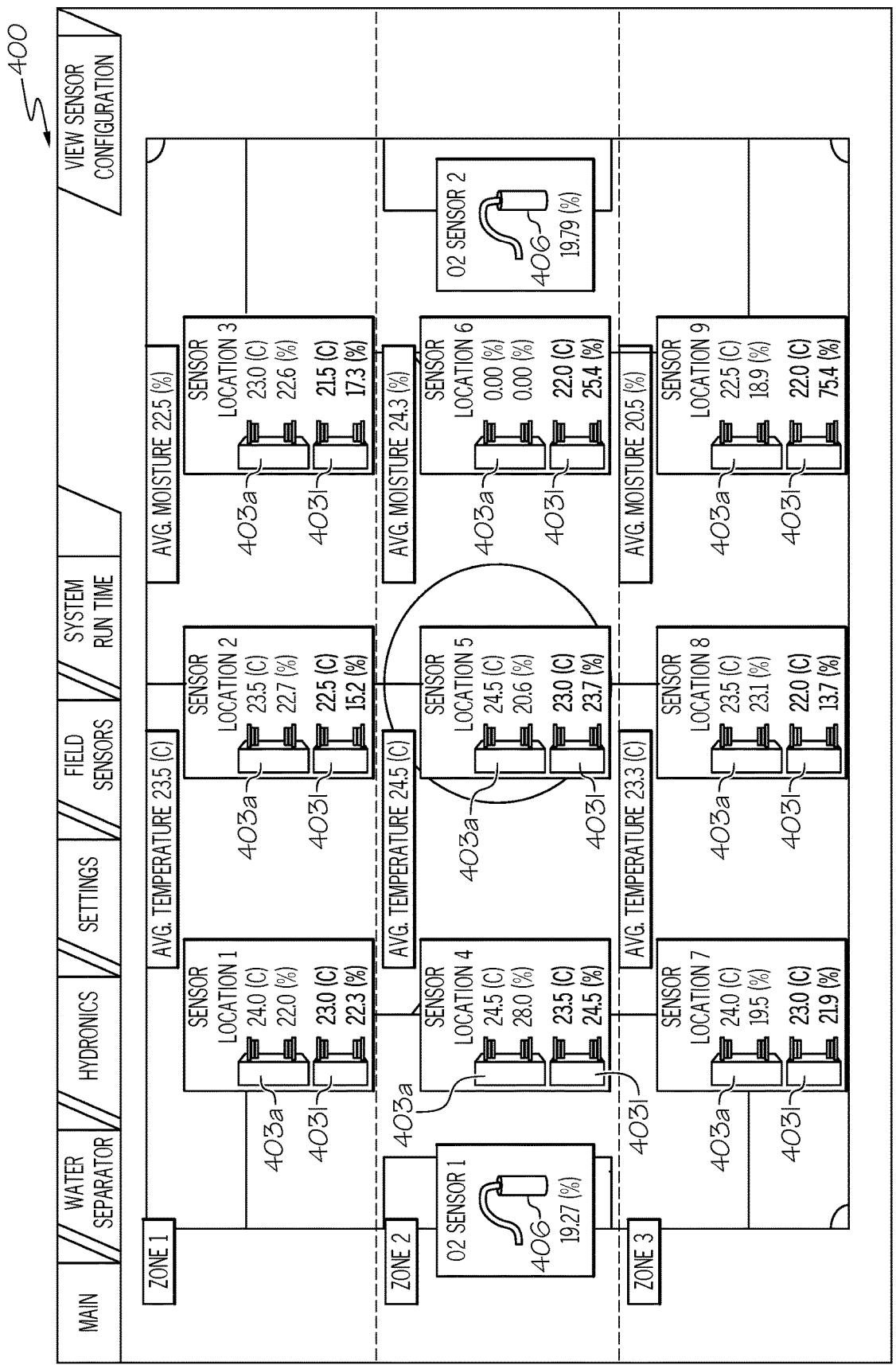
FIG. 4 is a screen shot of an example graphical user interface illustrating locations and operation of in-ground wireless sensors installed in a sports field operating environment for automatic monitoring and control of turf management systems in accordance with some embodiments described herein.

More particularly, hydronic systems in accordance with some embodiments described herein can be automatically monitored and controlled based on data received from wireless sensors placed at different and varying depths within the soil profile throughout the field. FIG. 4 illustrates an example user interface 400 displaying the layout of the in-ground wireless sensors 403$a$, 403$l$ in a 3-zone hydronic heated soccer pitch. The example system shown in FIG. 4 uses 18 wireless sensors, at 9 sensor locations (3 locations per zone for illustrated Zones 1-3) and 2 different depths per location (denoted by upper sensors 403$a$ and lower sensors 403$l$). For example, the upper sensors 403$a$ may be positioned in the soil profile 2 at a depth of about 2 inches below the green surface 15, and the lower sensors 403$l$ may be positioned in the soil profile 2 at a depth of about 5 inches below the green surface 15. However, it will be understood that the respective depths of the upper sensors 403$a$ (or likewise, the lower sensors 403$l$) need not be the same. The sensors 403$a$, 403$l$ are operable to detect and report soil data, including salinity levels, moisture levels, and/or temperature at their respective depths in the soil profile 2 in real-time. In particular, the user interface 400 of FIG. 4 displays respective soil temperatures and moisture levels at two depths (of the sensors 403$a$, 403$l$) for each of the locations 1-9, as well as respective soil oxygen levels at each end of the sports field (as indicated by signals received from oxygen sensors 406).

Figure 5:
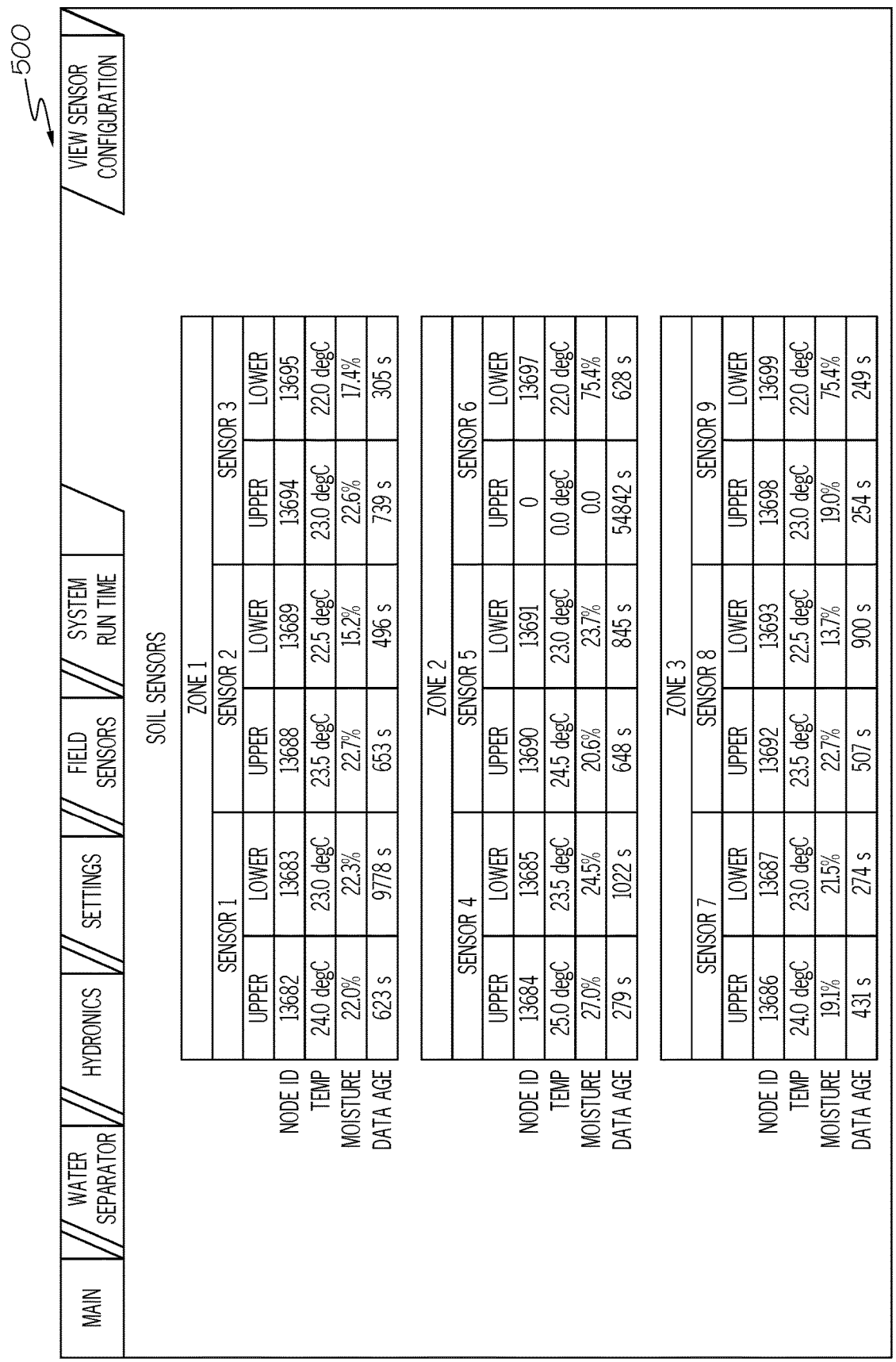
FIG. 5 is a screen shot of an example graphical user interface illustrating more detailed information reported by in-ground wireless sensors installed in a sports field operating environment for automatic monitoring and control of turf management systems in accordance with some embodiments described herein.

An example of another user interface 500 that displays the readings provided by the in-ground wireless sensors 403$a$, 403$l$ in accordance with embodiments described herein is shown in FIG. 5. In particular, the user interface 500 of FIG. 5 provides additional detail regarding the sensor data received from the wireless sensors 403$a$, 403$l$ at the sensor locations 1-9 for the three Zones 1-3, including the "age" (as measured in seconds) of the sensor data, that is, how long ago the last wireless signal from each sensor was received. For example, from the user interfaces 400 and 500, it can be seen that the upper sensor 403$a$ at sensor location 6 in Zone 2 is reporting temperature and moisture values of 0 degrees and 0 percent, respectively, which is inconsistent with the sensor data from other sensors in Zone 2. The user interface 500 further indicates that it has been 54,842 seconds since receipt of the last/most recent sensor data from the upper sensor 403$a$ at sensor location 6 in Zone 2, that is, the sensor data indicating the 0 degrees/0 percent moisture is much older than the sensor data received from the other sensors in Zone 2 (between 279s and 1022s), indicating erroneous operation. Thus, the temperature, moisture level, and/or data age can indicate or otherwise be used to detect erroneous operation of one or more of the sensors 403a, 403l and/or other system components.

Based on the temperature signals from the in-ground wireless sensors (such as the sensors 3, 303, 403a, 403l described above) and the desired soil profile temperature (which may be entered by the user via the user interfaces 400, 500), either heated or cooled air can be provided to the root zone of the soil profile by controlling interoperation of the airflow mechanism 115, 315 and the hydronic mechanism 120, 320. That is, the circulation and temperature of the fluid in the hydronic tubing 130 can be automatically controlled responsive to sensor data indicated by the wireless signals received from the in-ground wireless sensors 3, 303, 403a, 403l relative to user-defined or otherwise desired thresholds or ranges. The use of in-ground wireless sensors to control hydronic systems in accordance with embodiments described herein may provide greater reliability than wired sensors, which may be more susceptible to damage from maintenance operations that are typically performed on the green.

Figure 6:
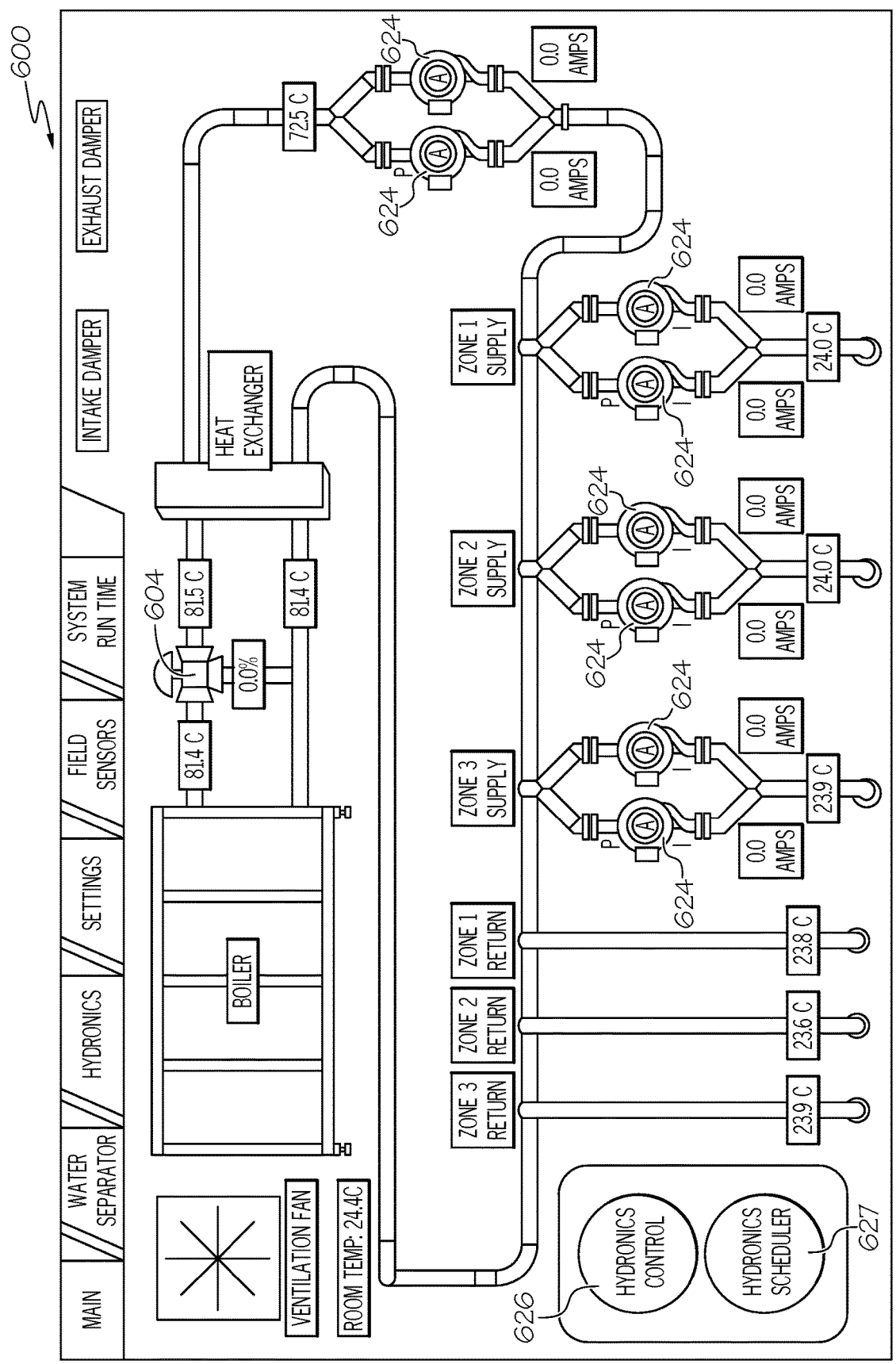
FIG. 6 is a screen shot of an example graphical user interface illustrating operation and interaction of various elements for control of hydronic mechanisms in turf management systems in accordance with some embodiments described herein.

FIG. 6 illustrates an example user interface 600 graphically representing elements including mixing valve 604 and fluid circulation pumps 624 of the hydronic turf temperature control system 120 shown in FIG. 1B, for temperature control of the soil profile in the Zones 1-3 shown in FIG. 4. The user interface 600 shown in FIG. 6 is configured to receive user inputs specifying the desired temperature or temperature range for each zone, and is also configured to display real-time information for user monitoring of the hydronic mechanism 120. For example, the user interface 600 includes a virtual button 626 for "hydronics control," which may be activated by a user, for example, by a touch input entered via a touchscreen. Responsive to receiving the user inputs, the system 120 is configured to control operation of the boiler 121 and/or the chiller 122 (including mixing of respective fluids provided thereby) in order to provide the fluid for circulation through the hydronic tubing 130, at temperatures determined to heat or cool the soil profile 2 to the user-defined or otherwise desired temperature(s).

More particularly, responsive to detecting temperatures exceeding a predetermined threshold temperature or temperature range, one or more of the wireless sensors 3, 303, 403a, 403l may transmit a signal to a wireless receiver 335, which is coupled to a programmable logic controller (PLC) or other processing unit(s) (such as the control circuits 125, 325, more generally referred to herein as a controller). The controller 125, 325 is coupled to the boiler 121 and/or chiller 122, and is configured to control operation of the boiler 121 or chiller 122 to heat or cool fluid therein to a temperature that is determined to provide the desired heating and/or cooling effect on the soil profile 2, based on the detected temperatures. The controller 125, 325 is also coupled to or otherwise includes or implements a motor start relay, which is configured to activate the green pump 124 and/or the chiller pump 123 (collectively referred to herein as a fluid circulation pumps 624) to selectively circulate the heated or cooled fluid in sections of the hydronic tubing 130 adjacent or closest to the locations of the respective wireless sensors 3, 303, 403a, 403l from which the signal(s) are received. For example, the controller 125, 325 may implement a proportional integral derivative (PID) loop that provides commands to the motor start relay via an Ethernet or other communication connection in response to detected changes relative to one or more desired setpoints, and the motor start relay may provide a variable frequency drive to control operation of the pumps 123, 124 to maintain the desired setpoint(s).

In the example implementation shown in FIG. 4, the heating of the soil profile may be controlled in each of the Zones 1-3 individually by the average of the data provided by the three upper sensors 403a that are closest to the green surface 15 in that zone. Also, if the readings indicated by one (or a minority) of the sensors 403a, 403l appears to be erroneous in comparison with the readings indicated by other (or a majority) of the sensors 403a, 403l, the readings from such sensor(s) may be discarded from the control algorithm. For instance, in the example user interfaces 400 and 500 of FIGS. 4 and 5, the values reported by the upper sensor 403a at location 6 (0.0°) is inconsistent with the values reported by the upper sensors 403a at locations 4 and 5, and thus, can be excluded in computing the average temperature in Zone 2. In some embodiments, an alarm or other visual indication of the malfunction of the upper sensor 403a at location 6 may be presented via the user interface(s) 400 and 500 shown in FIGS. 4 and 5.

FIG. 7 illustrates an example user interface 700 for a scheduling application that allows for further control of operations of turf management systems in accordance with embodiments described herein. In some embodiments, the scheduling application may be accessed via the "hydronics scheduler" virtual button 627 of the user interface 600 of FIG. 6, for example, by a touch input entered via a touchscreen. As shown in the example of FIG. 7, the scheduling application may be used automatically control operation of the hydronic system or mechanism 120 shown in FIG. 1B, to provide temperature control of the soil profile in the Zones 1-3 shown in FIG. 4. The user interface 700 of the scheduling application is configured to receive user inputs specifying scheduling data including desired soil profile temperatures for one or more of the zones (Zone 1, Zone 2, Zone 3) as well as other operating parameters, including but not limited to the desired start time, run time, and day/date of operation. The scheduling application may be configured to provide an output signal including the scheduling data indicating the times and/or parameters for scheduled operation to one or more control circuits described herein, such as the control circuits 125 and 325, which may be configured to store the scheduling data in a memory associated therewith and automatically control operation of the hydronic mechanism 120, 320 (and/or the airflow mechanism 115, 315) based on the times and/or parameters specified by the scheduling data.

In some embodiments, the scheduling application may be configured to dynamically alter one or more stored schedules based on real-time conditions detected by the wireless sensors 403a, 403l. For example, responsive to automatic operation of the hydronic system 120 to heat the soil profile 2 to a desired temperature in response to detection of an unexpected temperature swing by the in-ground wireless sensors 403a, 403l, the scheduling application may be configured to determine that one or more previously-scheduled start times and/or run times may be unnecessary to maintain the soil profile at the desired temperature, and thus, may shift or otherwise alter the start time, run time, and/or day/date of operation of the hydronic mechanism 120, as determined to be sufficient to maintain the desired soil conditions. Similarly, the scheduling application may be configured to move up a scheduled start time, run time, and/or day/date of operation of the hydronic mechanism 120 based on the real-time conditions reported by the wireless sensors 403*a*, 403*l*. Such dynamic scheduling behavior can also include altering operation of the system 120 for individual zones based on the reported real-time conditions from the wireless sensors 403*a*, 403*l*, for example, by turning on or off different water separators.

Scheduling control may also be done proactively or predictively based on the current sensor data and/or system operation. For example, if heated fluid is circulated in response to a current sensor event, the system may (based on the current temperature and/or other real-time sensor data) be configured to predict that temperature will continue to drop at a particular rate, and may automatically schedule operation of the system at a future time based on the predicted rate of change of the current soil profile temperature(s) in one or more of the zones. That is, embodiments described herein may thereby provide automatic adjustment or adaptation of scheduled hydronic heating/cooling operations based on current operation of the system and/or in response to the real-time sensor data.

Operation of turf management systems according to embodiments described herein can be fully automated and accessible through any internet connection or wireless device, including but not limited to smartphones, tablets, and/or laptop computers. Computer readable program code implementing control operations and/or applications that generate information displayed via user interfaces as described herein may be stored in a memory including a non-transitory computer readable storage medium that is accessible to the processor or other controller of such devices, for example, via a wired or wireless network transceiver. That is, the user interfaces described herein may be provided via any display, including those of wired or wireless devices that are configured to be communicatively coupled to the turf management systems via a wired and/or wireless communication interface.

Embodiments as described herein may thereby be used to detect, indicate, and/or automatically react to potential system failures that may damage the green surface, if left unchecked. For example, in some embodiments, a current transducer may be communicatively coupled to the controller 125, 325. The current transducer may be configured to monitor operation of the motor start relay, and based on signals from the current transducer, the controller 125, 325 may identify unrecognized pump failures that may be caused by motor start relay faults or electrical phase failure. In particular, if monitoring indicates that the motor is drawing current greater than a known threshold, the controller 125, 325 may be configured to transmit one or more signals or commands to turn off the motor and provide an alarm indicator, for example, to indicate a thermal problem with the associated pump, via the user interface. As an alternative, when multiple pumps are available, the controller 125, 325 may be configured to transmit one or more signals or commands to alternate operation between pumps or switch to different pumps, in order to alleviate load on the problematic pump. Conversely, if monitoring indicates that the motor is drawing no current when the motor start relay is closed, the controller 125, 325 may be configured to transmit one or more signals to provide an indicator via the user interface, to display or otherwise indicate failure of the associated pump.

As another example, a counter may be restarted in response to each reporting event received from the in-ground wireless sensors, to ensure that sensor data received by the controller 125, 325 is up-to-date. If one or more of the wireless sensors fails to report for a predetermined amount of time, the controller 125, 325 may be configured to transmit one or more signals to provide an indicator of malfunction of the wireless sensor(s) via the user interface. Similarly, sensor data received from each of the in-ground wireless sensors may be compared by the controller 125, 325 in order to identify sensor data that is inaccurate or is otherwise being reported incorrectly, and an indicator of malfunction of the wireless sensor(s) may be provided via the user interface. Also, as mentioned above, data reported by such wireless sensor(s) may be removed or otherwise ignored by the controller 125, 325 when calculating average values.

As a further example, turf management systems as described herein may include redundant mechanical equipment. In response to detection of failure in one or more elements of the primary mechanical equipment, the controller 125, 325 may be configured to automatically start the redundant mechanical equipment. Also, system faults can be reported to the building management system by the controller 125, 325 as a general alarm. For instance, any failure in the above logic may generate an alarm in the local and general alarm system. An operator can then log on and diagnose the problem via one or more of the user interfaces described herein.

Accordingly, embodiments described herein provide automatic control of airflow and/or hydronic heating/cooling of a green surface, for example, in sports turf applications, based on data received from wireless sensors in real time, even responsive to sudden changes in soil conditions. Also, although described herein primarily with reference to temperature regulation, some embodiments may be similarly operated to provide automatic moisture regulation based on the sensor data received from the in-ground wireless sensors. For example, responsive detecting moisture levels indicative of a sudden downpour, the turf management system may be automatically controlled to operate in vacuum mode and/or increase or decrease the temperature of fluid circulating in the hydronic tubing to reduce excess moisture in the soil profile. Some embodiments described herein may also maintain historical data to provide information of the impact of agronomic practices, natural phenomena and weather events on turf conditions. The historical data and/or scheduling data may be stored in a computer readable storage medium that is coupled to the controllers or control circuits described herein. As such, embodiments described herein may more evenly distribute temperature and/or moisture and thus reduce variation of conditions in the green surface, which may be of particular benefit in sports field applications.

The present invention has been described above with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout.

It will be understood that when an element is referred to as being "on," "connected," or "coupled" to another element, it can be directly on, connected, or coupled to the other element, or intervening elements may be present. In contrast, when an element is referred to as being "directly on," "directly connected," or "directly coupled" to another element, there are no intervening elements present.

It will also be understood that, although the terms first, second, etc. may be used herein to describe various elements, these elements should not be limited by these terms.

These terms are only used to distinguish one element from another. For example, a first element could be termed a second element, and, similarly, a second element could be termed a first element, without departing from the scope of the present invention.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "include," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The Figures illustrate the architecture, functionality, and operations of embodiments of hardware and/or software according to various embodiments of the present invention. It will be understood that each block of a flowchart and/or block diagram illustrations, and combinations of blocks in the flowchart and/or block diagram illustrations, may be implemented by computer program instructions and/or hardware operations. In this regard, each block represents a module, segment, or portion of code, which comprises one or more executable instructions for implementing the specified logical function(s). It should be noted that, in other implementations, the function(s) noted in the blocks may occur out of the order noted in the Figures. For example, two blocks shown in succession may, in fact, be executed substantially concurrently, or the blocks may sometimes be executed in the reverse order, depending on the functionality involved.

The computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks. The computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

Unless otherwise defined, all terms used in disclosing embodiments of the invention, including technical and scientific terms, have the same meaning as commonly understood by one of ordinary skill in the art to which this invention belongs, and are not necessarily limited to the specific definitions known at the time of the present invention being described. Accordingly, these terms can include equivalent terms that are created after such time. It will be further understood that terms, such as those defined in commonly used dictionaries, should be interpreted as having a meaning that is consistent with their meaning in the present specification and in the context of the relevant art and will not be interpreted in an idealized or overly formal sense unless expressly so defined herein. All publications, patent applications, patents, and other references mentioned herein are incorporated by reference in their entireties.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments of the present invention described herein, and of the manner and process of making and using them, and shall support claims to any such combination or subcombination.

Although the invention has been described herein with reference to various embodiments, it will be appreciated that further variations and modifications may be made within the scope and spirit of the principles of the invention. Although specific terms are employed, they are used in a generic and descriptive sense only and not for purposes of limitation, the scope of the present invention being set forth in the following claims.

That which is claimed:

1. A turf management system, comprising:
a wireless receiver configured to receive respective wireless signals comprising sensor data from wireless sensors positioned in a soil profile at respective depths below a green surface, wherein two or more of the respective depths are different;
a control circuit coupled to the wireless receiver and configured to determine soil profile conditions at the respective depths below the green surface responsive to the sensor data; and
a subsoil environmental control mechanism coupled to the control circuit, wherein the subsoil environmental control mechanism comprises a hydronic mechanism comprising at least one fluid circulation pump that is configured to be coupled to a hydronic tubing network below the green surface, and an airflow mechanism that is configured to be coupled to one or more drainage pipes having perforations therein underlying the hydronic tubing network,
wherein the control circuit is configured to automatically control operation of the subsoil environmental control mechanism by generating and transmitting respective control signals that coordinate operation of the hydronic mechanism with operation of the airflow mechanism responsive to the soil profile conditions at the respective depths below the green surface, wherein the operation of the hydronic mechanism warms or cools and circulates fluid through the hydronic tubing network responsive to the soil profile conditions, and wherein the operation of the airflow mechanism forces airflow through the perforations in the one or more drainage pipes, around and adjacent the hydronic tubing network having the fluid warmed or cooled and circulated therethrough, and toward a root zone of the soil profile responsive to the soil profile conditions.

2. The turf management system of claim 1, wherein the airflow mechanism comprises a blower system that is configured to be coupled to the one or more drainage pipes having the perforations therein below the green surface, and wherein the control circuit is configured to automatically control the operation of the blower system to alter the airflow through the one or more drainage pipes.

3. The turf management system of claim 2, wherein the blower system is configured to operate in a vacuum mode that applies a vacuum to the one or more drainage pipes, and a pressure mode that applies the air pressure to the one or more drainage pipes to force the airflow through the perforations therein, and wherein the control circuit is configured to control the blower system to operate in the pressure mode rather than the vacuum mode in coordination with the operation of the hydronic mechanism to warm or cool and circulate the fluid.

4. The turf management system of claim 3, wherein the hydronic mechanism comprises a fluid heater and/or a fluid chiller coupled to the at least one fluid circulation pump, and wherein the control circuit is configured to automatically control operation of the fluid circulation pump, the fluid heater, and/or the fluid chiller to control circulation and temperature of the fluid responsive to the soil profile conditions.

5. The turf management system of claim 4, wherein the at least one fluid circulation pump comprises a plurality of fluid circulation pumps, and wherein the control circuit is configured to selectively operate one or more of the fluid circulation pumps corresponding to one or more respective portions of the hydronic tubing network that are closest to respective locations of the wireless sensors from which the respective wireless signals are received.

6. The turf management system of claim 4, wherein the control circuit comprises at least one motor start relay that is configured to activate the at least one fluid circulation pump to circulate the fluid, and further comprising:
a current transducer configured to output a monitoring signal indication operation of the at least one motor start relay, wherein the control circuit is configured to identify a failure of the at least one fluid circulation pump based on the monitoring signal and output an alarm signal indicative of the same.

7. The turf management system of claim 1, wherein the control circuit is configured to automatically control the operation of the subsoil environmental control mechanism responsive to the soil profile conditions exceeding a user-defined threshold or temperature range received via a user interface of a device that is communicatively coupled to the control circuit.

8. The turf management system of claim 1, wherein the control circuit is further configured to automatically control the operation of the subsoil environmental control mechanism responsive to times and/or parameters for scheduled operation received via a scheduling application executing on a device that is communicatively coupled to the control circuit.

9. The turf management system of claim 8, wherein the scheduling application is configured to dynamically alter the times and/or parameters for the scheduled operation based on present operation of the subsoil environmental control mechanism.

10. The turf management system of claim 8, wherein the scheduling application is configured to predictively alter the times and/or parameters for the scheduled operation based on a predicted rate of change of the soil profile conditions determined from the sensor data.

11. The turf management system of claim 1, wherein the control circuit is configured to coordinate the operation of the hydronic mechanism with the operation of the airflow mechanism based on the soil profile conditions at the respective depths below the green surface by comparing the sensor data from the wireless sensors at the respective depths, and discarding a subset of the sensor data based on the comparing, wherein the subset comprises data for one of the respective depths that is inconsistent with data for others of the respective depths.

12. The turf management system of claim 1, wherein the control circuit is configured to coordinate the operation of the hydronic mechanism with the operation of the airflow mechanism to adjust a temperature of the soil profile by up to 120 degrees Fahrenheit based on the soil profile conditions at the respective depths below the green surface.

13. A turf management system, comprising:
a hydronic mechanism comprising a fluid circulation pump that is configured to be coupled to a hydronic tubing network below a green surface;
an airflow mechanism comprising a blower system that is configured to be coupled to one or more drainage pipes having perforations therein below the green surface and underlying the hydronic tubing network; and
a control circuit that is coupled to the hydronic mechanism and the airflow mechanism, wherein the control circuit is configured to generate and transmit respective control signals that coordinate operation of the hydronic mechanism with operation of the airflow mechanism responsive to soil profile conditions at respective depths below the green surface, wherein at least two of the respective depths are different,
wherein the operation of the hydronic mechanism warms or cools and circulates fluid through the hydronic tubing network responsive to the soil profile conditions, and
wherein the operation of the airflow mechanism forces airflow through the one or more drainage pipes and the perforations therein, around and adjacent the hydronic tubing network having the fluid warmed or cooled and circulated therethrough, and toward a root zone of the soil profile responsive to the soil profile conditions and the operation of the hydronic mechanism.

14. The turf management system of claim 13, further comprising:
a wireless receiver coupled to the control circuit and configured to receive respective wireless signals comprising sensor data from wireless sensors positioned in a soil profile at the respective depths below the green surface,
wherein the control circuit is configured to determine the soil profile conditions at the respective depths below the green surface responsive to the sensor data.

15. The turf management system of claim 14, wherein the hydronic mechanism comprises a fluid heater and/or a fluid chiller coupled to the fluid circulation pump, and wherein the control circuit is configured to automatically operate the fluid heater and/or the fluid chiller to control temperature of the fluid based on the soil profile conditions.

16. The turf management system of claim 13, wherein the control circuit is further configured to automatically operate the airflow mechanism and/or the hydronic mechanism responsive to times and/or parameters for scheduled operation received via a scheduling application executing on a device that is communicatively coupled to the control circuit.

17. A turf management method, the method comprising:

receiving, via a user interface, times and/or parameters for scheduled operation of a subsoil environmental control mechanism comprising an airflow mechanism that is configured to be coupled to one or more drainage pipes having perforations therein below a green surface and a hydronic mechanism comprising at least one fluid circulation pump that is configured to be coupled to a hydronic tubing network below the green surface;

generating scheduling data indicating the times and/or parameters; and transmitting an output signal comprising the scheduling data to a control circuit that is coupled to and is configured to automatically operate the subsoil environmental control mechanism by generating and transmitting respective control signals that coordinate operation of the hydronic mechanism with operation of the airflow mechanism responsive to soil profile conditions at respective depths below the green surface and according to the times and/or parameters indicated by the scheduling data, wherein two or more of the respective depths are different, wherein the operation of the hydronic mechanism warms or cools and circulates fluid through the hydronic tubing network responsive to the soil profile conditions, and wherein the operation of the airflow mechanism forces the airflow through the perforations in the one or more drainage pipes, around and adjacent the hydronic tubing network having the fluid warmed or cooled and circulated therethrough, and toward a root zone of the soil profile responsive to the soil profile conditions.

18. The turf management method of claim 17, further comprising:

dynamically altering the times and/or parameters for the scheduled operation based on present operation of the subsoil environmental control mechanism.

19. The turf management method of claim 17, further comprising:

determining the soil profile conditions at the respective depths below the green surface based on sensor data received from wireless sensors positioned in a soil profile at the respective depths below the green surface; and predictively altering the times and/or parameters for the scheduled operation based on a predicted rate of change of the soil profile conditions determined from the sensor data.

* * * * *